United States Patent
McHale et al.

(10) Patent No.: US 9,612,115 B2
(45) Date of Patent: Apr. 4, 2017

(54) TARGET-CORRELATED ELECTRONIC RANGEFINDER

(75) Inventors: John Francis McHale, Austin, TX (US); John Hancock Lupher, Austin, TX (US)

(73) Assignee: TRACKINGPOINT, INC., Austin, TX (US)

( * ) Notice: Subject to any disclaimer, the term of this patent is extended or adjusted under 35 U.S.C. 154(b) by 230 days.

(21) Appl. No.: 13/491,575

(22) Filed: Jun. 7, 2012

(65) Prior Publication Data

US 2013/0329211 A1 Dec. 12, 2013

(51) Int. Cl.
*G01C 15/00* (2006.01)
*F41G 3/06* (2006.01)

(52) U.S. Cl.
CPC ........... *G01C 15/002* (2013.01); *F41G 3/065* (2013.01)

(58) Field of Classification Search
CPC ..................................... G01C 15/00
USPC ............ 356/3.01–3.15, 4.01–4.1, 5.01–5.15, 356/6–22, 28, 139.01–139.1
See application file for complete search history.

(56) References Cited

U.S. PATENT DOCUMENTS

| | | |
|---|---|---|
| 6,269,581 B1 | 8/2001 | Groh |
| 7,255,035 B2 | 8/2007 | Mowers |
| 7,856,750 B2 | 12/2010 | Sammut et al. |
| 8,400,619 B1 * | 3/2013 | Bachrach ................. G01C 1/04 356/4.01 |
| 2005/0057745 A1 * | 3/2005 | Bontje ................. G01C 15/002 356/139.03 |
| 2005/0219690 A1 | 10/2005 | Lin et al. |
| 2005/0252062 A1 | 11/2005 | Scrogin et al. |
| 2007/0132982 A1 * | 6/2007 | Vermillion et al. ......... 356/4.01 |
| 2007/0175081 A1 | 8/2007 | Lacorte |
| 2009/0200376 A1 | 8/2009 | Peters et al. |
| 2010/0245800 A1 * | 9/2010 | Brown ..................... G01C 3/08 356/4.02 |
| 2012/0033195 A1 * | 2/2012 | Tai .............................. 356/4.01 |

OTHER PUBLICATIONS

Shepherd Enterprises, Inc. Range Finding Scope, www.shepherdscopes.com/range.asp, Jun. 7, 2012, pp. 1-2.
Leatherwood Hi Lux Rifle Scopes, CTI Warehouse Network, www.ctico.com/leatherwood.htm, Jun. 7, 2012, pp. 1-9.
Burris "Eliminator" Laser Rangefinding Riflescope 4-12×42—Impact Guns, www.impactguns.com/burris-eliminator-laser-rangefinding-riflescope-4-12×42-20112 . . . , Jun. 7, 2012, pp. 1-2.

* cited by examiner

*Primary Examiner* — Luke Ratcliffe
(74) *Attorney, Agent, or Firm* — Cesari & Reed, LLP; R. Michael Reed

(57) ABSTRACT

A viewing device includes a laser rangefinder circuit configured to capture range data associated with a target within a view area and at least one sensor configured to capture orientation data associated with an aim-point of the laser rangefinder circuit concurrently with capturing the range data. The viewing device further includes a controller coupled to the laser rangefinder and to the at least one sensor and configured to automatically determine a range to the target from the range data based on the orientation data and a target location within the view area.

21 Claims, 6 Drawing Sheets

| Target Location | | Range (m) |
|---|---|---|
| $X(t_1)$ | $Y(t_1)$ | Range ($m_1$) |
| $X(t_2)$ | $Y(t_2)$ | Range ($m_2$) |
| $X(t_3)$ | $Y(t_3)$ | Range ($m_3$) |
| $X(t_4)$ | $Y(t_4)$ | Range ($m_4$) |
| $X(t_5)$ | $Y(t_5)$ | Range ($m_5$) |
| $X(t_N)$ | $Y(t_N)$ | Range ($m_N$) |

TARGET-CORRELATED ELECTRONIC RANGEFINDER

FIELD

The present disclosure is generally related to electronic devices including range finding functionality.

BACKGROUND

Rangefinder devices provide an exact distance to targets. One common type of rangefinder is a laser rangefinder that uses a laser beam to determine the distance to an object by sending a laser pulse in a narrow beam towards the object and measuring the time taken by the pulse to be reflected off the target and returned to the sender.

In some examples, military rangefinders can be combined with telescopic devices, such as binoculars or monoculars, to determine a range to a distant target. Unfortunately, human jitter can adversely impact the user's ability to maintain the aim-point of the rangefinder on a target, particularly at long range. Accordingly, the user may be unable to acquire range measurements or the user may acquire range measurements that are related to another object within the view area, which may result in the user incorrectly determining the range.

SUMMARY

In an embodiment, a viewing device includes a laser rangefinder circuit configured to capture range data associated with a target within a view area and at least one sensor configured to capture orientation data associated with an aim-point of the laser rangefinder circuit concurrently with capturing the range data. The viewing device further includes a controller coupled to the laser rangefinder and to the at least one sensor and configured to automatically determine a range to the target from the range data based on the orientation data and a target location within the view area.

In another embodiment, a telescopic device includes a laser rangefinder circuit configured to capture range data associated with a target within a view area and at least one sensor configured to capture orientation data associated with an aim-point of the laser rangefinder circuit concurrently with capturing the range data. The telescopic device further includes a controller coupled to the laser rangefinder circuit and to the at least one sensor and configured to automatically determine a range to the target from the range data based on the orientation data and a target location within the view area.

In still another embodiment, a method includes capturing range data associated with a target within a view area of a viewing device using a laser rangefinder circuit and concurrently capturing orientation data of the viewing device for each range value of the plurality of range values using at least one sensor. The method further includes automatically determining a range to the target from the range data based on the orientation data and a position of the target within the view area.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
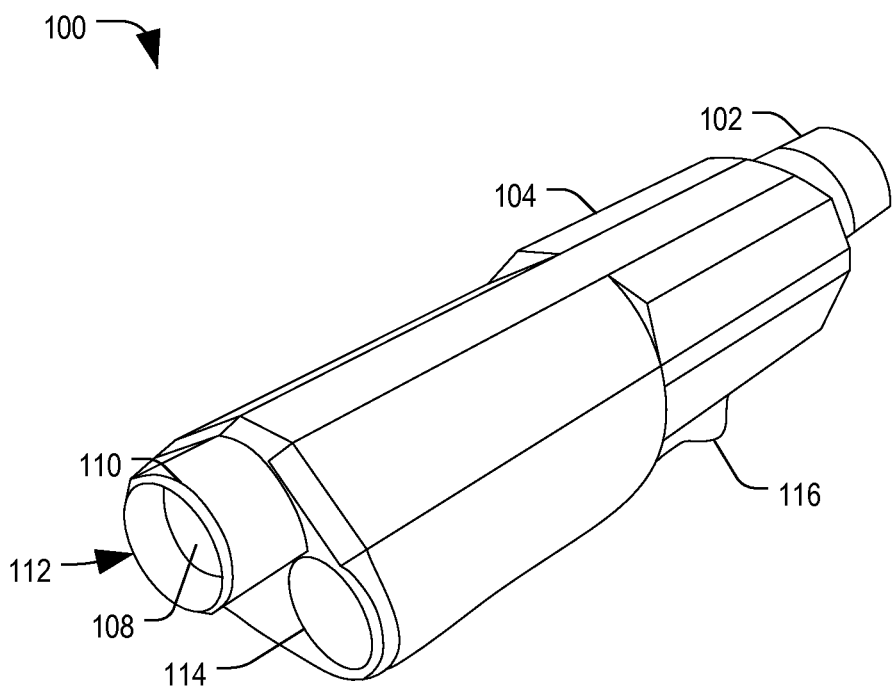
FIG. 1 is a perspective view of telescopic device including a target-correlated rangefinder according to an embodiment.

Embodiments of a telescopic device are described below that include a circuit configured to perform target-correlated range finding. The target may be selected by a user or may be automatically acquired before or after acquisition of range data. Upon target selection, the range to the target may be determined either from previously acquired range data individually correlated to the orientation of the telescopic device relative to the target by firing the laser rangefinder when the telescopic device is aligned to the selected target.

In one example, the telescopic device uses a laser rangefinder circuit to capture a plurality of range values associated with the aim-point of the laser beam during a period of time. The aim-point corresponds to the orientation of the laser beam relative to a view area of the telescopic device and is determined by the user and is dependent on the user's ability to steadily point at the target. A controller measures the orientation of the telescopic device from various orientation sensors, such as inclinometers, gyroscopes, accelerometers, image sensors, and the like, at the moment when the laser rangefinder circuit fires the laser beam toward the intended target. The laser rangefinder continues to fire pulses for a period of time creating multiple range values for a given field of view based on the orientation of the laser rangefinder each time the laser is fired by the controller. The laser rangefinder circuit receives reflections corresponding to the laser beam at that particular orientation and determines the range to an object at the location in the view area. A controller maps the orientation data from the orientation sensors for each beam pulse to each of the range data measurements. The controller receives a target selection input (either from a user or from an automatic target acquisition operation) that determines the location of the target in the view area and selects the range values that correspond to the selected target (correlated to the range values corresponding to the target based on the orientation of the laser beam at the time it is fired) to determine a range.

In a particular example, target selection includes applying a visual tag to the selected target, and the selected range values correlate to a position of the visual tag on the selected target within the view area. In another particular example, target selection can include applying edge detection, contrast detection, texture detection, or another algorithm to detect the edges of a target and the selected range values correspond to the ranges sampled from within the determined edges of the target. In another particular example the target selection can be determined by calculating the average position of the aim-point during the range finding process and utilizing this average position as the target position.

In another example, the telescopic device captures range values corresponding to a previously identified target (either automatically or user selected). Controller uses the orientation data from the orientation sensors to control the laser rangefinder to fire the laser beam and capture corresponding range values when the laser beam is aligned to the selected target.

FIG. 1 is a perspective view of telescopic device 100 including a target-correlated rangefinder according to an embodiment. Telescopic device 100 includes an eyepiece 102 through which a user may look to see a view area. Telescopic device 100 further includes a housing 104 that defines an enclosure sized to secure circuitry and sensors configured to determine environmental parameters, to receive user inputs, to select a target (automatically or in response to user inputs), and to determine a range to the selected target from data collected by a laser rangefinder circuit within housing 104. Housing 104 also includes optical sensors, optionally one or more mirrors, laser rangefinder circuitry, and other image processing circuitry configurable to digitally magnify and process optical data captured by the optical sensors. Telescopic device 100 further includes a lens portion 110 including an objective lens for focusing light toward the optical sensors. Telescopic device 100 further includes a laser rangefinder transmitter 112 and a laser rangefinder receiver 114 for transmitting a laser beam toward the aim-point and for receiving reflections of the laser beam to determine a distance to the target. Additionally, telescopic device 100 includes one or more ports 116 configurable to couple to an external device, such as a smart phone, laptop or tablet computer, or other computing device to transfer information and/or instructions, bi-directionally.

Telescopic device 100 is configured to determine a range correlated to the selected target. The target may be selected by a user by interacting with a user interface, such as one or more buttons (not shown) on the telescopic device 100 or on a structure associated with the telescopic device 100, such as a button on a grip of a firearm. Alternatively, the target may be selected through implicit user feedback and associated orientation data or image processing, such as by detecting when the user is holding the aim-point of telescopic device 100 on a particular object within the view area for a period of time. In such an example, a processor of telescopic device 100 can determine when the period of time exceeds a threshold and process optical data from the view area to identify the selected target. In this example, image processing may be applied to refine the target selection, such as by using edge detection, texture detection, contrast detection, and other image processing techniques to identify the boundaries of the selected target.

In still another example, telescopic device 100 may automatically select a target based on localized contrast within the view area by processing optical data to identify objects within the view area that have a high contrast relative to other objects within the view area. Further, telescopic device 100 may apply other image processing, such as edge detection, texture detection, contrast detection, and/or other image processing techniques to identify the edges/boundaries of objects within the view area that can be selected as a target.

Figure 2:
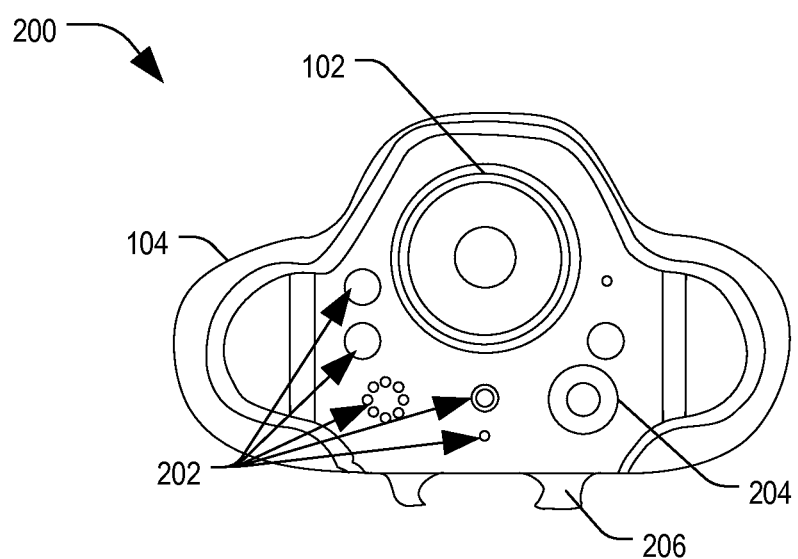
FIG. 2 is a front-view of an embodiment of the telescopic device of FIG. 1.

FIG. 2 is a front-view 200 of an embodiment of the telescopic device 100 of FIG. 1. In addition to eyepiece 102, telescopic device 100 includes a plurality of indicators, generally indicated at 202, which can, for example, depict a current battery charge, a status of a connection to associated circuitry (such as circuitry within a trigger assembly), environmental conditions, and so on.

In the illustrated embodiment, telescopic device 100 includes mounting rails 206 configurable to releasably attach to a structure, such as a corresponding mounting structure of a firearm, making it possible for telescopic device 100 to be attached to a firearm and configured to operate as a rifle scope. An example of the telescopic device 100 configured to operate as a rifle scope to provide a precision guided firearm is described below with respect to FIG. 3.

Figure 3:
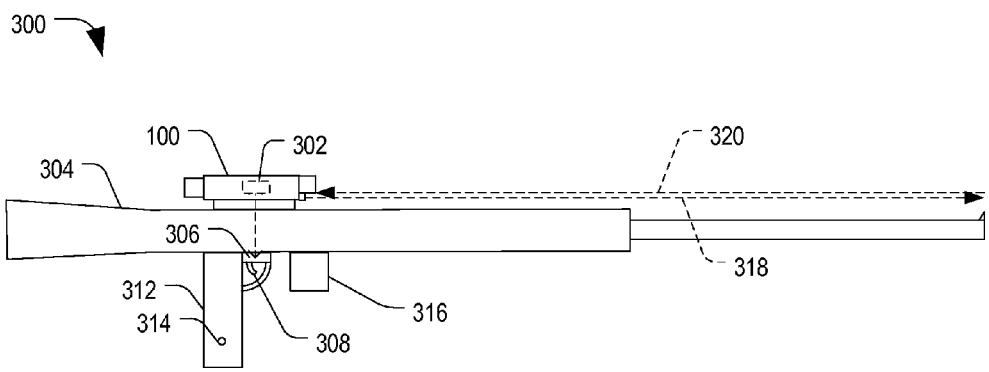
FIG. 3 is a side-view of an embodiment of a precision guided firearm including the telescopic device of FIG. 1.

FIG. 3 is a side-view of an embodiment of a firearm 300 including the telescopic device 100 of FIG. 1. Firearm 300 includes telescopic device 100 that is mounted to a rifle 304 and that includes circuitry 302. Firearm 300 further includes a trigger shoe 308, a trigger guard 310, a handle or grip 312, which may include one or more buttons, such as button 314, which can be coupled to an interface of telescopic device 100. The user may interact with button 314 to initiate a target selection process, to select a target within the view area, and/or to initiate a laser range finding operation.

Circuitry 302 includes a laser rangefinder circuit having a transmitter 112 (depicted in FIG. 1) configured to direct a laser beam 318 toward a target and a receiver 114 (depicted in FIG. 1) configured to receive a reflected version 320 of laser beam 318. The laser rangefinder circuit determines a range to a target based on timing between transmission of laser beam 318 and reception of reflected version 320. In one embodiment, a controller associated with circuitry 302 is configured to correlate the range measurements associated with the view area to the orientation of the laser beam and the location of a selected target at a point in time. In an example, the laser rangefinder circuit captures range data associated with objects within the view area including the target. To determine the range, the controller selects the range data corresponding to a target location of the selected target within the view area from the range data. In another embodiment, the controller associated with circuitry 302 controls the laser rangefinder circuit to fire the laser beam and/or sample the reflections when the laser beam is directed at a location of a selected target within the view area. An example of an integrated circuit that includes the laser rangefinder circuit is described below with respect to FIG. 4.

Figure 4:
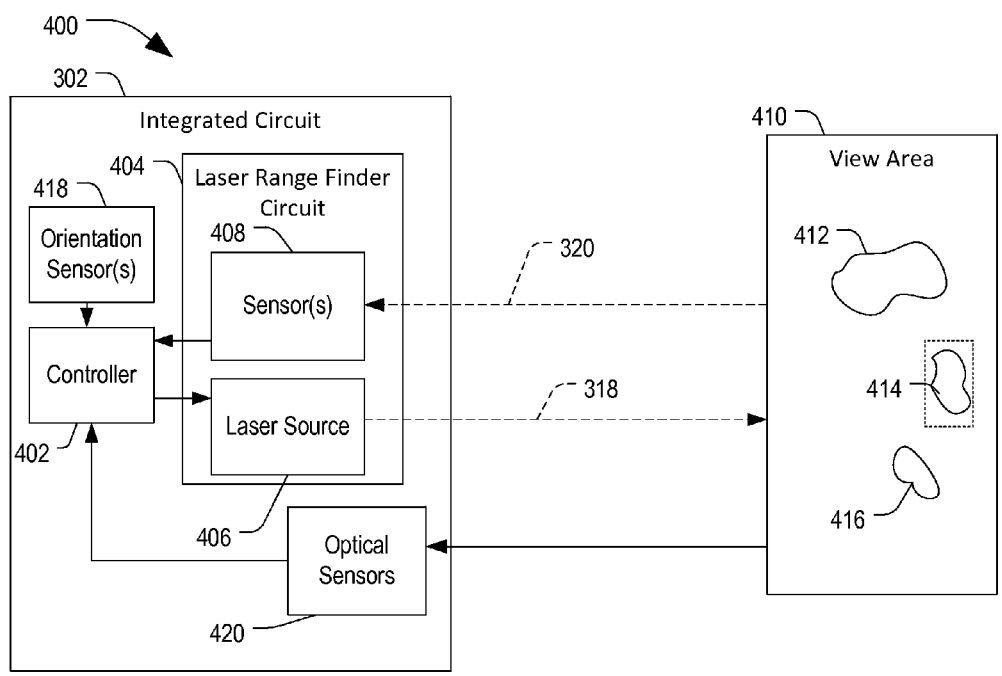
FIG. 4 is a block diagram of an embodiment of a system including a target-correlated rangefinder.

FIG. 4 is a block diagram of an embodiment of a system 400 including a target-correlated rangefinder. System 400 includes circuitry 302, which, in this example, is an integrated circuit that includes a controller 402 and a laser rangefinder circuit 404. Circuitry 302 further includes orientation sensors 418, which can include one or more inclinometers, one or more gyroscopes, one or more accelerometers, and/or other sensors that can be used to provide orientation data for telescopic device 100 (in FIGS. 1-3). In particular, orientation sensors 418 are coupled to a controller of circuitry 302 and configured to provide orientation data associated with an aim-point of the laser beam 318 when the laser beam 318 is fired. Additionally, circuitry 302 includes one or more optical sensors 420 configured to capture optical information associated with the view area 410 for further processing by a processor of circuitry 302 and/or for providing to a display associated with circuitry 302. While optical sensors 420 are shown as receiving optical information via a single arrow, it should be understood that optical sensors 420 receive optical information for the entirety of the view area 410.

Laser rangefinder circuit 404 includes a laser source 406 (which is part of transmitter 112 in FIG. 1) configured to transmit one or more laser beam pulses 318 toward a view area 410 of telescopic device 100 in response to control signals from controller 402. Laser rangefinder circuit 404 further includes one or more sensors 408 (which are part of receiver 114 in FIG. 1) configured to receive reflected versions 320 of the one or more laser beam pulses 318 and to communicate signals to controller 402 in response to receiving reflected versions 320.

View area 410 includes objects 412, 414, and 416, which may be ranged by laser rangefinder circuit 404. Though the user may attempt to range a particular target, human jitter (particularly at long ranges) may cause the user to alter the aim-point of laser beam 318 so that multiple range values are collected that correspond to different objects within the view area 410, including foreground and background objects. However, controller 402 is configured to map each of the range values from laser rangefinder circuit 404 to the particular orientation of the telescopic device 100 at the point in time where the range value is determined. In particular, controller 402 maps each range value to a corresponding orientation of telescopic device 100 based on orientation data from orientation sensors 418, thereby mapping the aim-point of the laser beam 318 to the range values collected. Such data may be stored in a memory with a time stamp for each range value so that the data may be accessed, at a later time, to retrieve a range value in response to a target selection.

In an example, when the user presses a rangefinder button (which may be on telescopic device 100 or on another structure, such as the grip 312 of a firearm, the laser rangefinder circuit 404 is activated to determine a range for objects within a view area. In this example, a plurality of range values may be collected, some of which may relate to a target and some of which may relate to other objects within the view area. In response to selection of a target (either automatic selection or manual selection), controller 402 determines a range to the selected target from the plurality of range values based on the correlated orientation. In other words, controller 402 determines which of the captured range values correspond to the selected target and selects or calculates the "exact" range from those range values. In an example, selection of the target includes selection of a location (X-Y position) of the target within the view area 410, which position is mapped to one or more captured range values. An example of a view area including a target where the laser rangefinder circuit 404 captures multiple range values (some of which correspond to the target) is described below with respect to FIG. 5.

Figures 5, 6:
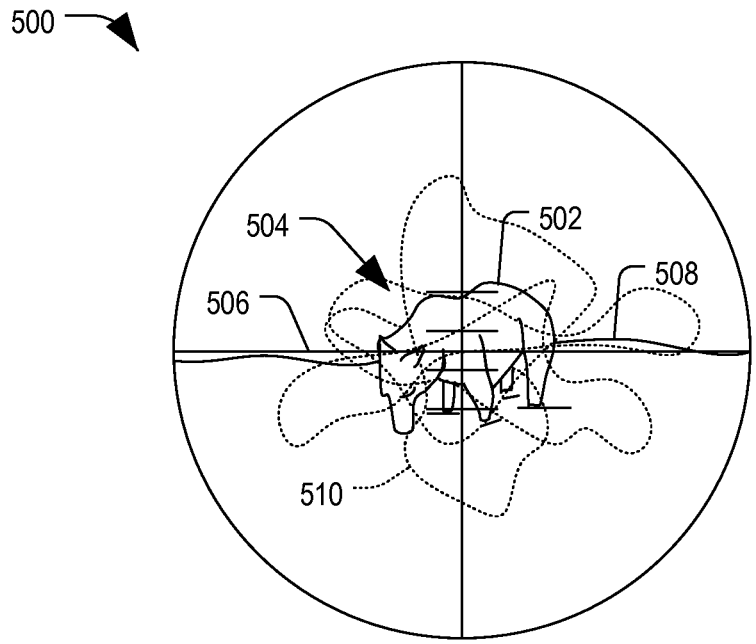
FIG. 5 is a representative example of a view area of a telescopic device depicting human jitter and corresponding movement of the laser beam of the rangefinder.
FIG. 6 is a representative example of a table including range values correlated to time and position of the telescopic device relative to objects within a view area captured from the view area depicted in FIG. 5.

FIG. 5 is a representative example of a view area 500 of a telescopic device 100 depicting human jitter and corresponding movement of the laser beam of the rangefinder. View area 500 includes a reticle 506 having a center 504 that is aligned to a target 502 at a particular point in time. A dashed line 510 represents movement of the aim-point of the laser rangefinder due to jitter over time. Laser rangefinder circuit 404 captures a plurality of range values corresponding to the view area, and some of the range values correspond to target 502. Controller 402 receives the plurality of range values and correlates the range value to the orientation of telescopic device 100 at the time the laser beam was pulsed and to a temporal parameter, making it possible for controller 402 to determine the range to a selected target once a target is identified at some later point in time.

The user can then capture laser range values for the view area by orienting the telescopic device 100 toward a desired target. Unfortunately, due to human jitter, a user may not be able to maintain the telescopic device on target for an extended period, moving back and forth and around the target as represented by dashed line 510. Laser rangefinder circuit 404 uses sensors 408 to capture a plurality of range values as reflected versions 320 of the laser beam pulses are received. Thus, laser rangefinder circuit 404 can capture a plurality of range values relative to objects within view area 500. An example of a table for storing the captured values is described with respect to FIG. 6.

FIG. 6 is a representative example of a table 600 including a plurality of range values correlated to time and position of the telescopic device relative to objects within a view area captured from the view area depicted in FIG. 5. Within table 600, each range value is associated with an X-Y location within the view area 500 as a function of time. Laser rangefinder circuit 404 can capture any number of range values, for example, by pulsing the laser beam and capturing reflected versions of the laser beam over a predetermined period of time. In this example, each point is represented as a function of time and is correlated to a corresponding range measurement. Further, laser rangefinder circuit 404 can capture any number of range values, including some range values that correspond to objects within the view area 500 other than the target 502. Further, table 600 may record a time stamp for each range value.

In response to a target selection, controller 402 can identify a subset of the plurality of range values that correspond to the selected target. In this example, rows 602, 604, and 606 of table 600 correspond to the selected target, and other rows contain range data associated with other objects within view area 500 in FIG. 5. Controller 402 utilizes the time and orientation data (in this instance X and Y data at specific times) to identify those range values (in meters, i.e., $m_2, m_3, \ldots, m_N$) that correspond to a target location within view area 500, and uses those values to determine the range to the target. Thus, controller 402 determines the range for the selected target based on range values correlated to the position of the target within the view area 500. If there is a disparity between the captured range values for the selected target, such disparity may be caused by movement of the target, and controller 402 may select the most recent data correlated to the target for determining the range.

In an automatic target selection context, controller 402 may process the location data (X-Y location samples) to identify an average position, which may be used to determine a target location. This automatic selection presumes that the user will attempt to aim the device at the target, and that jitter may cause the aim-point to vary, but that the user will adjust the aim-point to try to remain on the target. By determining the average aim-point, controller 402 may automatically select the target from view area 500 based on this type of implicit user feedback.

While the above-example uses previously captured and correlated range values to determine the range to the target in response to a target selection, it is also possible to measure a distance to a previously selected target. In one embodiment, controller 402 automatically selects and visually tags a target. In another embodiment, controller 402 receives a signal from an input interface that identifies a selected target within the view area 500. In response to the target selection, laser rangefinder circuit 404 may fire the laser beam when telescopic device 100 is aligned to the selected target, which target selection may be represented by a visual marker or tag. In one example, the visual tag may be a small geometric shape that is applied to a "kill zone" of the target, such as the heart, neck or head. In another example, after application of the visual tag, image processing operations may be performed to determine the edges or boundaries of the target, and laser rangefinder circuit 404 may fire the laser beam when the laser beam is aligned to the target (within the edges or boundaries). Thus, laser rangefinder circuit 404 selectively fires the laser source 406 when a center of the reticle of telescopic device 100 is aligned to the selected target, thereby taking range measurements that are correlated to the selected target. An example of a view area depicting the capture of range values for the target is described below with respect to FIG. 7.

Figure 7:
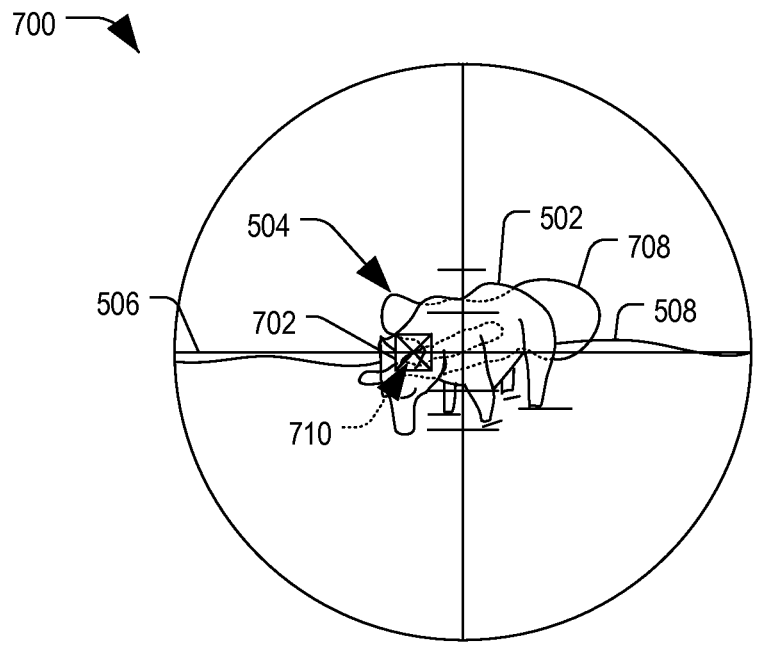
FIG. 7 is a representative example of a view area of a telescopic device including a selected target.

FIG. 7 is a representative example of a view area 700 of telescopic device 100 including a selected target 502. View area 700 includes reticle 506 having a center 504 that is aligned to target 502 at a particular point in time. In this example, target 502 has been selected and tagged (visually marked) as indicated at 702. Solid line 708 and dashed line 710 represent movement of the aim-point of laser beam 318 relative to target 502 due to jitter. When the aim-point is outside of the boundaries of the selected target 502, the laser beam is "off target" as indicated by solid line 708. When the laser beam is off target, laser rangefinder circuit 404 either does not fire the laser beam 318 or does not sample the reflected version 320. Dashed line 710 represents the aim-point of the laser beam 318 when it is on target, and laser rangefinder circuit 404 captures range values associated with reflected version 320 while laser beam 318 is on target 502. Thus, the range values are correlated to target 502. In a particular embodiment, the laser rangefinder circuit 404 may be configured to range only the visual tag, capturing the range values only when the aim-point of the laser beam 318 corresponds directly to the location of the visual tag 702 on target 502.

While in the example of FIGS. 5 and 6 the range values are correlated to the orientation of telescopic device 100, to a time parameter ($t_i$), and to an X-Y location of the aim-point of the laser beam at the time ($t_i$), the example described above with respect to FIG. 7 are correlated to the target 502 because controller 402 captures values only when the laser beam is pointed at the target 502. In this example, telescopic device 100 does not sample the reflected version and/or does not fire the laser beam unless the laser beam is pointed at target 502. The orientation of the telescopic device 100 is determined relative to objects in the view area using the orientation data from one or more of the orientation sensors 418 (inclinometers, gyroscopes, accelerometers, etc.). An example of a table of range values collected by laser rangefinder circuit 404 that are correlated directly target 502 is described below with respect to FIG. 8.

Figure 8:
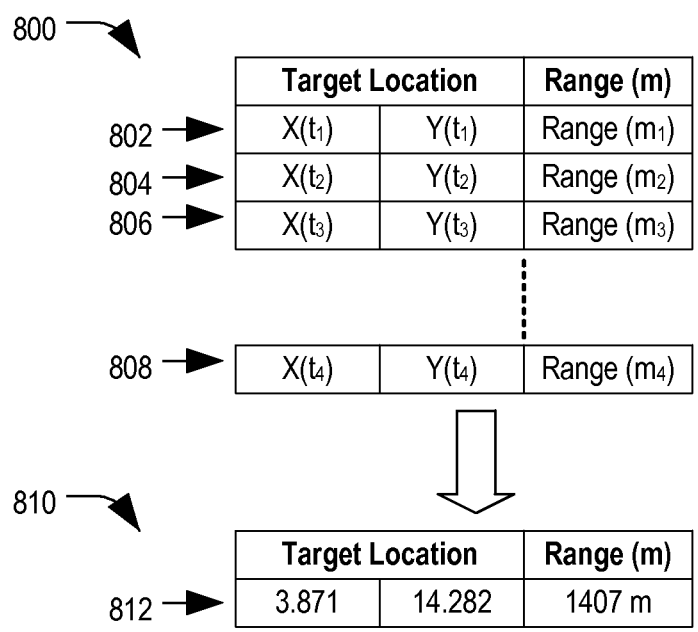
FIG. 8 is a representative example of a table of range values correlated to the selected target of FIG. 7.

FIG. 8 is a representative example of a table 800 of range values correlated to the selected target 502 of FIG. 7. In the illustrated example, table 800 includes a plurality of location to range value mappings 802, 804, 806, and 808 (as well as other such mappings, not shown) that are captured by laser rangefinder circuit 404 when the laser beam is pointed at selected target 502. Controller 402 may process images to determine the edges or boundaries of the selected target 502 and capture range values when the aim-point of telescopic device 100 falls within the identified boundaries, capturing any number of range values and mapping them to the corresponding location value based on orientation data from the motion sensors. In this example, the target-correlated range values can vary by some fraction of a meter because of the contour or orientation of the portion of the target 502 corresponding to the visual tag. In an example, once the target is selected (either automatically or by the user), a processor of telescopic device 100 is configured to use the target-correlated range values to determine a range to the target. Table 800 may also store a time-stamp (not shown).

Once the target-correlated range values are captured, the target location and range value mappings can be reduced to a single target location value and a single range, providing a target-correlated range 812, as depicted in table 810. In table 810, the target location may be identified by X and Y locations, which can be specified by decimal values to a selected level of precision as indicated by the decimal places. Further, the range can be reduced to a single value, also to a selected level of precision.

In general, controller 402 can be implemented using programmable logic, such as a field programmable gate array and/or a processor and a memory storing instructions that are executable by the processor. An example of a processor-based implementation is described below with respect to FIG. 9.

Figure 9:
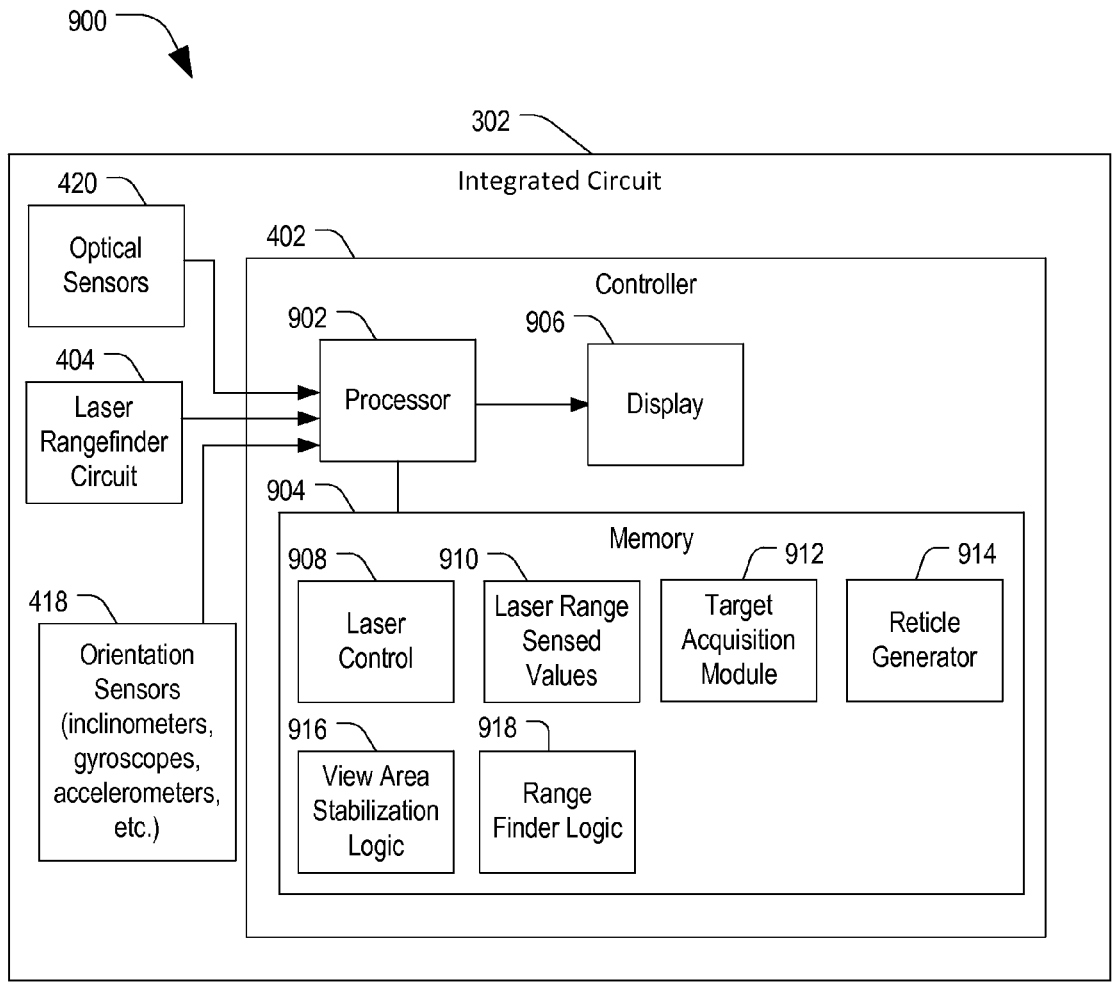
FIG. 9 is a block diagram of an embodiment of a laser rangefinder system configured to determine a target-correlated range.

FIG. 9 is a block diagram of an embodiment of a laser rangefinder system 900 configured to determine a target-correlated range. Laser rangefinder system 900 includes an integrated circuit 302 including laser rangefinder circuit 404, orientation sensors 418 (inclinometers, gyroscopes, accelerometers, etc.), and a controller 402. Controller 402 includes a processor 902 coupled to optical sensor 420 and to orientation sensors 418. Controller 402 further includes a memory 904 and a display 906 that are coupled to processor 902.

Memory 904 includes laser control instructions 908 that, when executed by processor 902, cause processor 902 to control laser rangefinder circuit 404 to pulse a laser beam toward the view area (or toward a selected target), to receive reflected versions of the laser beam from one or more objects in the view area (or from the selected target), and to determine a plurality of range values. Processor 902 correlates each range value to orientation data from orientation sensors 418 and to a timestamp. In a particular example, processor 902 controls laser rangefinder circuit 404 to direct the laser beam toward the aim-point of the telescopic device 100 only when a reticle of the telescopic device 100 is aligned to the visual tag on the previously selected target. Range values captured by laser rangefinder circuit 404 may be stored in a table in memory 904, such as laser range sensed values 910, which range values are correlated with orientation information (X-Y location within the view area) and temporal information.

Memory 904 further includes a target acquisition module 912 that, when executed, causes processor 902 to automatically select a target within the view area. In one embodiment, target acquisition module 912 determines, based on orientation and motion data from orientation sensors 418, that a user is trying to aim telescopic device 100 toward a particular object within the view area. In one instance, processor 902 executes target acquisition module 912 to detect an average aim-point over a period of time, and automatically selects the target based on the average aim-point. In another embodiment, target acquisition module 912 processes images captured by optical sensors 420 of telescopic device 100 to identify and select the target, such as based on localized motion of an object within the view area. Further, edge detection, contrast detection, texture detection, and other image processing techniques may be used to automatically identify and select a target within the view area.

Memory 904 also includes a reticle generator 914 that, when executed, causes processor 902 to generate a reticle and to provide the reticle to display 906. In an example, reticle generator 914 provides a reticle at a center of the view area corresponding to an aim-point of the laser beam of laser rangefinder circuit 404. Memory 904 further includes view area stabilization logic 916 that, when executed, causes processor 902 to temporarily freeze the view area on display 906 in order to facilitate the user manually selecting or tagging the target. Memory 904 also includes rangefinder logic 918 that, when executed, causes processor 902 to identify range values correlated to the selected target from laser range sensed values 910 and to determine a range based on the identified range values, whether the target is selected automatically or manually. In most instances, this operation can be performed any number of times and each operation can be completed within a fraction of a second. In one example, target acquisition module 912 selects the target in response to user input (explicit or implicit) or automatically. The explicit user input may be a signal corresponding to a button press or release or to another user selection of a user-selectable element on an interface of telescopic device 100 or on an associated device, such as rifle 304. The implicit user input may be based on the relatively stationary aim-point of the telescopic device 100 for a period of time.

In an example, if the motion data determined by orientation sensors 418 are less than a pre-determined threshold for a period of time, processor 902 may execute target acquisition module 912 to identify and select the target corresponding to the relatively static aim-point of telescopic device 100. In a particular example, during a target selection process, the user may press a target selection button, and in response to the target selection button press, processor 902 executes view area stabilization logic 916 to stabilize the displayed version of the view area on display 906, allowing the user to adjust the orientation of the telescopic device to align the reticle to a desired target. When the reticle is aligned to the target, the user may release the target selection button or press another button to select the target. Once the target is selected, the stabilization may be removed and the processor 902 executes laser rangefinder logic 918 to control laser rangefinder circuit 404 to pulse laser source 406 when the telescopic device 100 is aligned to the target.

In the above-examples, range values may be collected concurrently with orientation data. In a "backward looking" implementation, the range values and orientation data can be correlated in time to produce position-oriented range values and the correlated values can be stored with a corresponding timestamp in a table in memory. Once a target is selected or identified, those range values corresponding to the X and Y position of the target (target location) within the view area can be used to determine the range to the target. In the event that the target is moving and there is a discrepancy between range values for the selected target, the most recent range data may be selected based on the timestamps. In a "forward looking" implementation, the range values are collected when the orientation data indicates that the aim-point of the laser beam corresponds to the location of the previously-selected target.

While the above-examples are described in terms of embodiments or implementations, in some instances, the backward and forward looking operations may be different operating modes of telescopic device 100. An example of a method of determining the range based on the orientation data is described below with respect to FIG. 10.

Figure 10:
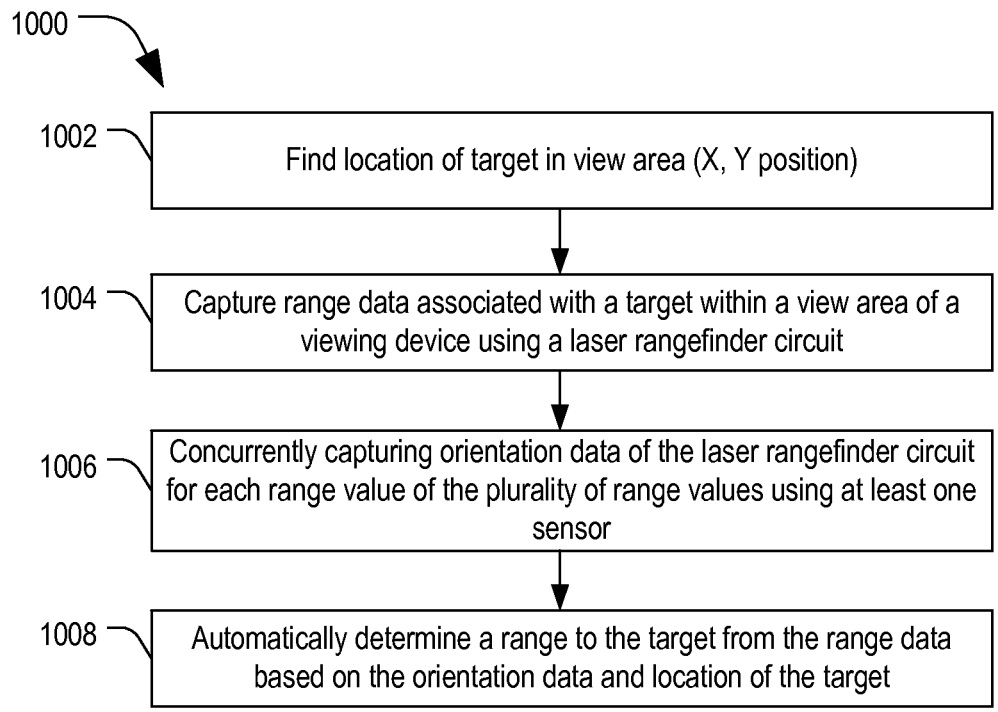
FIG. 10 is a flow diagram of an embodiment of a method of providing a target-correlated range.

FIG. 10 is a flow diagram of an embodiment of a method 1000 of providing a target-correlated range. At 1002, controller 402 of viewing device finds a location of a target (X-Y Position) in a view area. In this example, the target was previously selected either manually or automatically. In one embodiment, controller 402 applies a visual marker or tag to the selected target. Advancing to 1004, viewing device uses a laser rangefinder circuit 404 to capture range data associated with a target within a view area. In an embodiment, controller 402 determines boundaries of the selected target and laser rangefinder circuit 404 captures a plurality of range data associated with the target within the view area when the aim-point of the laser beam falls within the identified boundaries. In an alternative embodiment, laser rangefinder circuit 404 captures range data associated with a visual tag applied to a previously selected target. Advancing to 1006, viewing device concurrently captures orientation data of the laser rangefinder circuit 404 for each range value of the plurality of range values using at least one sensor.

Continuing to 1008, controller 402 of viewing device automatically determines a range to the target from the range data and based on the orientation data corresponding to the target location. The target location can be an X-Y position of the target within the view area.

While the above-example is directed to target ranging after target selection, as previously discussed, it is also possible to sample multiple range values associated with a view area, to receive a target selection signal, and to determine the range to the target in response to the target selection signal. An example of a method of determining a range to a selected target in response to target selection is described below with respect to FIG. 11.

Figure 11:
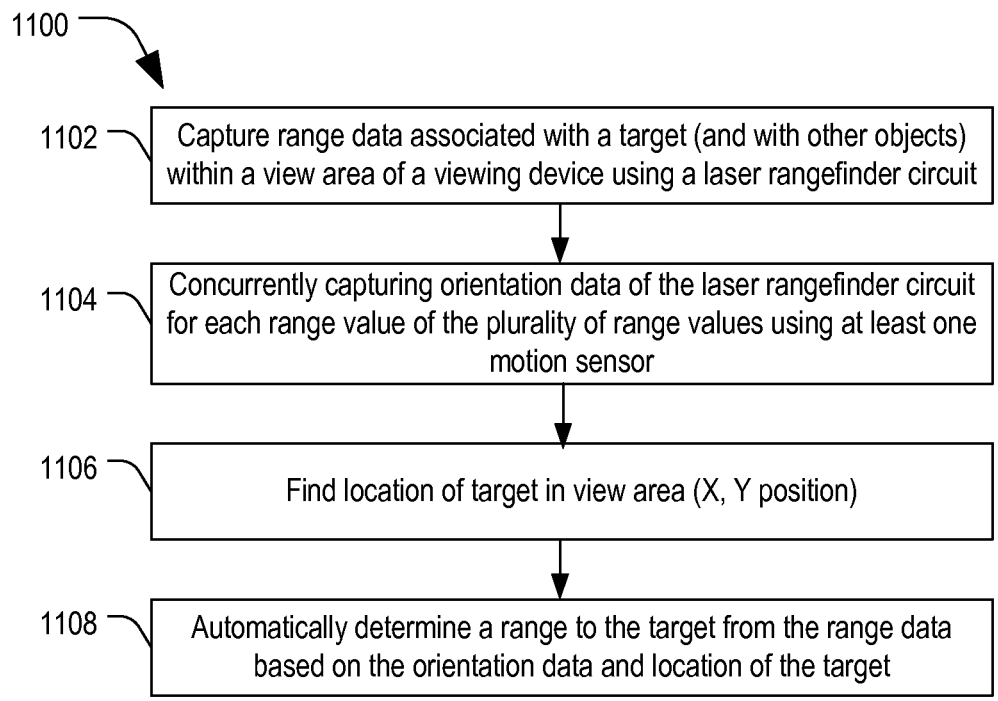
FIG. 11 is a flow diagram of a second embodiment of a method of providing a target-correlated range.

FIG. 11 is a flow diagram of a second embodiment of a method 1100 of providing a target-correlated range. At 1102, the laser rangefinder circuit 404 captures range data associated with a target (and with other objects) within a view area of a viewing device. In one example, the viewing device can be telescopic device 100. Advancing to 1104, viewing device concurrently captures orientation data of the laser rangefinder circuit 404 for each range value of the plurality of range values using at least one motion sensor. Continuing to 1106, controller 402 finds the location of the target in the view area (X-Y position), based on implicit user feedback, manual selections (such as button presses), or some combination thereof. Moving to 1108, controller 402 automatically determines a range to the target from the range data based on the orientation data and the target location within the view area.

While the above-discussion has largely focused on a telescopic device 100 that can be implemented as a rifle scope, it should be appreciated that any number of optical devices may employ circuitry as described herein to determine a target-correlated range. For example, circuitry 302 may be implemented within a telescope, binoculars, a spotting scope, or any type of portable optical device for which range finding is used. As used herein, the term "viewing device" refers to any of the aforementioned portable optical devices.

In conjunction with the views, the systems, circuits, and methods described above with respect to FIGS. 1-11, a telescopic device includes a target-correlated rangefinder having a laser rangefinder circuit, a controller, and one or more orientation sensors configured to determine an orientation of the telescopic device relative to a view area. In one embodiment, the controller uses the laser rangefinder circuit to capture a plurality of values associated with the view area and to correlate the plurality of values to orientation data of the telescopic device. Once a target is identified, the controller selects the range values correlated to the position of the target within the view area to determine the range. In another embodiment, the controller controls the laser rangefinder circuit to fire the laser beam and to capture reflected versions of the laser beam that correspond to the position of a previously selected target within the view area. In this embodiment, the controller may control the laser rangefinder circuit to fire the laser beam only when a reticle of the telescopic device is aligned with the previously selected target. Thus, in either embodiment, the laser range values are correlated to a selected target, which target selection may be automatic or manual.

Although the present invention has been described with reference to preferred embodiments, workers skilled in the art will recognize that changes may be made in form and detail without departing from the scope of the invention.

What is claimed is:

1. An apparatus comprising:
    a firearm scope including:
        a laser rangefinder circuit configured to capture range data including multiple values associated with a view area and at least one range data value associated with a target within the view area;
        at least one sensor configured to capture orientation data associated with an aim-point of the laser rangefinder circuit concurrently with capturing the range data; and
        a controller coupled to the laser rangefinder circuit and to the at least one sensor and configured to correlate the range data to the orientation data and to objects in the view area and to automatically determine a range to the target from the range data based on the correlated range data.

2. The apparatus of claim 1, wherein the controller receives a target selection signal and controls the laser rangefinder circuit to capture the range data corresponding to the target in response to receiving the target selection signal.

3. The apparatus of claim 2, wherein:
    the controller includes a target acquisition module configured to automatically select the target location from a plurality of objects within the view area; and
    the target acquisition module provides the target location to the laser rangefinder circuit.

4. The apparatus of claim 2, wherein the controller receives the target location from a user input interface accessible by a user.

5. The apparatus of claim 1, wherein the controller automatically calculates a target location based on an average aim-point of the firearm scope.

6. The apparatus of claim 2, wherein the controller maps the plurality of range data to the orientation data, receives a target selection location, and automatically determines the range to the target by selecting the range data correlated to the target location from the plurality of range data based on the selected target.

7. The apparatus of claim 1, wherein the laser rangefinder circuit comprises:
    a light source configured to provide a laser beam;
    an optical sensor configured to receive a reflected version of the laser beam; and
    logic circuitry coupled to the light source and the optical sensor and configured to determine a distance between the light source and an object based on timing between providing the laser beam and receiving the reflected version to produce the range data.

8. The apparatus of claim 1, wherein the at least one sensor comprises at least one of a gyroscope, an inclinometer, an accelerometer and an image sensor.

9. An apparatus comprising:
    a firearm; and
    a telescopic device coupled to the gun and including:
        a laser rangefinder circuit configured to capture range data including multiple range values associated with a view area and a target within the view area;
        at least one sensor configured to capture orientation data associated with an aim-point of the laser rangefinder circuit concurrently with capturing the range data; and
        a controller coupled to the laser rangefinder circuit and to the at least one sensor and configured to correlate each of the multiple range values to the orientation data and to automatically determine a range to the target from the range data based on the correlated range data.

10. The apparatus of claim 9, wherein the controller receives a target selection signal indicating a target location within the view area and controls the laser rangefinder circuit to capture the range data corresponding to the target location.

11. The apparatus of claim 10, wherein the controller receives the target selection signal from a user input interface accessible by a user.

12. The apparatus of claim 10, wherein:
    the controller includes a target acquisition module configured to automatically select the target from a plurality of objects within the view area; and
    the target acquisition module provides the target selection signal.

13. The apparatus of claim 12, wherein:
    the laser rangefinder circuit captures a plurality of range data associated with the view area including the range data associated with the target; and
    the controller correlates the plurality of range data to the orientation data-and to a time parameter, receives the target selection signal, automatically determines the range to the target by selecting the range data correlated to the target from the plurality of range data in response to the target selection signal.

14. The apparatus of claim 9, wherein the laser rangefinder circuit comprises:
    a light source configured to provide a laser beam;
    an optical sensor configured to receive a reflected version of the laser beam; and
    logic circuitry coupled to the light source and the optical sensor and configured to determine a distance between the light source and an object based on timing between providing the laser beam and receiving the reflected version to produce the first range data.

15. The apparatus of claim 9, wherein the at least one sensor comprises at least one of a gyroscope, an inclinometer, an accelerometer, and an image sensor.

16. A method comprising:
    capturing range data including multiple range values associated with a plurality of objects including a target within a view area of a viewing device using a laser rangefinder circuit of the viewing device that is coupled to a firearm;
    concurrently capturing orientation data corresponding to an orientation of the viewing device for each range data of the plurality of range data using at least one sensor;

correlating, using a processor of the viewing device, the range data to the orientation data for each of the multiple range values to provide correlated data; and automatically determining a range to the target based on the correlated data using the processor.

17. The method of claim 16, wherein automatically determining the range comprises selecting the range data from the plurality of range data corresponding to the target based on a target selection signal indicating the position of the target.

18. The method of claim 16, further comprising:

receiving a target selection signal indicating the position of the target within the view area; and wherein at least one of capturing the range data and automatically determining the range is performed in response to receiving the target selection signal.

19. The method of claim 18, further comprising wherein receiving the target selection signal comprises receiving at least one of a user input selecting the target and an automatically generated target selection signal.

20. The method of claim 16, wherein concurrently capturing the orientation data comprises receiving the orientation data from one or more sensors selected from a group consisting of an inclinometer, a gyroscopic sensor, an accelerometer, and an image sensor.

21. The apparatus of claim 1, further comprising:

a firearm;

wherein the firearm scope is mounted on the firearm.

* * * * *